April 9, 1940.　　　O. O. WISTE　　　2,196,573
PROPELLER
Filed June 12, 1939
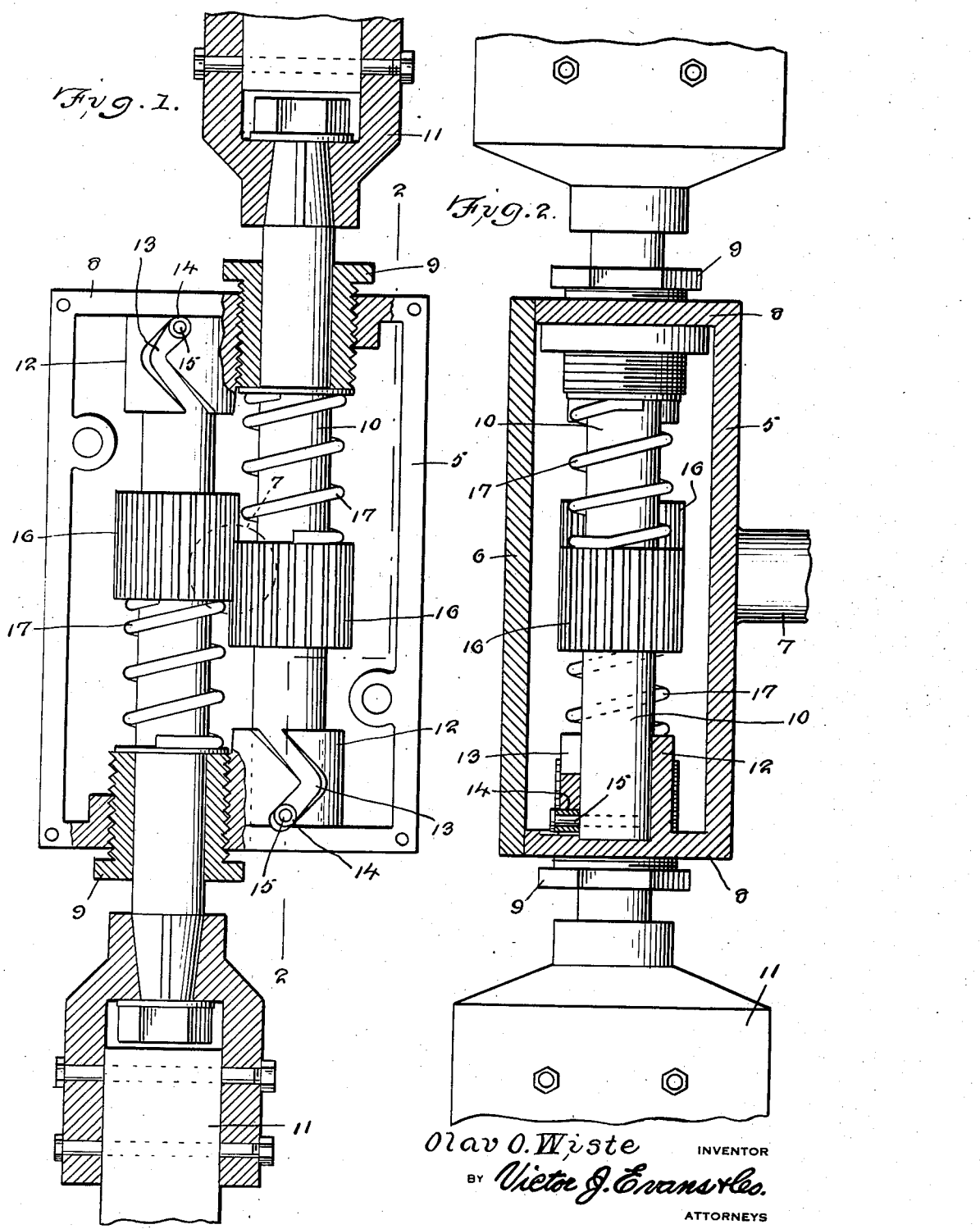
Olav O. Wiste INVENTOR
BY Victor J. Evans & Co.
ATTORNEYS Patented Apr. 9, 1940

2,196,573

UNITED STATES PATENT OFFICE 2,196,573

PROPELLER

Olav O. Wiste, Glendon, Alberta, Canada

Application June 12, 1939, Serial No. 278,793

1 Claim. (Cl. 170—68)

My invention relates to propellers and has as one of the principal objects thereof the provision of a propeller in which the blades are automatically adjusted according to the velocity of the wind, the device being especially adaptable for use in connection with wind operated generators and the like.

Another object of my device is to provide a device of the character described which is simple in construction, durable in use, efficient in operation and economical in manufacture.

Other objects and advantages will be apparent from the following description, appended claim and annexed drawing.

Referring to the drawing wherein like reference characters designate like parts throughout the several views:

Figure 1 is a front elevation of my invention, partly in section, the cover plate of the hub housing being removed.

Figure 2 is a sectional view taken on the line 2—2 of Figure 1.

In practicing my invention, I provide a propeller hub housing 5, the latter being of an oil tight construction and provided with a detachable front plate 6 for permitting access to the interior of the housing. The housing 5 is connected to the drive shaft 7 of a wind operated generator (not shown). The housing is fashioned with end walls 8 having threadedly and adjustably mounted therein bushings 9 through which extend the outer sections of blade carrying shafts 10, the outer ends of said shafts being fixed to the lower ends of propeller blades 11. The inner ends of the shafts are journaled in bearings 12 arranged in axial alignment with the bushings 9. The bearings 12 are provided in their sides with angular slots 13 in which are operable rollers 14 rotatably mounted on the ends of pins 15 extending into and fixed to the lower ends of the shafts 10. The shafts have fixed thereto, between their respective bushings and bearings 9 and 12, gears 16 meshing with each other and interposed between said gears and the respective bushings are coil springs 17 surrounding said shafts.

Obviously, by adjusting the bushings 9 relative to the housing, the tension of the coil springs 17 may be varied, whereby, upon rotation of the housing, the inner ends of the shafts 10, through the medium of centrifugal force, are actuated towards the respective bushings and against the tension of the springs 17. When the inner ends are thus actuated, the rollers engaging the walls of the slots 13 serve to effect rotatable adjustment of the respective shafts and thereby vary the pitch of the blades.

From the foregoing it will be apparent that I have provided a simple and efficient device for automatically varying the pitch of propeller blades and that the same is capable of manual adjustment whereby the pitch of said blades may be initially set to develop a desired speed in accordance with the velocity of the wind for operating the blades.

It is also obvious that the invention is not confined to the herein described use therefor as it may be utilized for any purpose to which it is adaptable. It is therefore to be distinctly understood that the invention is not limited to the specific construction as illustrated and described, as the same is only illustrative of the principles of operation which are capable of extended application in advance forms, and that the invention comprehends all construction within the scope of the appended claim.

Furthermore, it can be readily understood that the slots 13 in the bearings 12 permit variation of the propeller pitch to allow starting in winds of extremely low velocity as well as acting as governors in winds of relatively high velocity for the reason that the slots 13 are defined by pairs of spaced walls providing tracks for the respective rollers and each wall is fashioned with a pair of oppositely inclined sections whereby oscillatory movement is imparted to the shafts when the latter are axially moved with respect to the housing. The oscillatory movement of the shafts serves to vary the pitch of the propeller blades attached thereto. The acute angles of the slots 13 coact with the pins to dispose the blades 11 with an initially high pitch (for a large starting torque) and which becomes low for high speeds and then becomes high again at extremely high speeds.

What I claim is:

A device of the character described, comprising, a housing, bushings adjustably mounted in said housing, shafts extending through said bushings into said housing and axially and rotatably adjustable relative to said bushings, bearings arranged in said housing and receiving the inner ends of said shafts, said bearings formed with angular slots, pins carried by said shafts and operable in said slots for effecting rotatable adjustment of said shafts relative to said housing, gears carried by said shafts and slidably meshing with each other, springs on said shafts between said gears and bushings and adjustable by the latter to effect axial adjustment of said shafts.

OLAV O. WISTE.